Jan. 19, 1954     O. J. POUPITCH     2,666,468
LOCK WASHER WITH THICK RIM AND METHOD OF MAKING SAME
Filed July 22, 1949     2 Sheets-Sheet 1
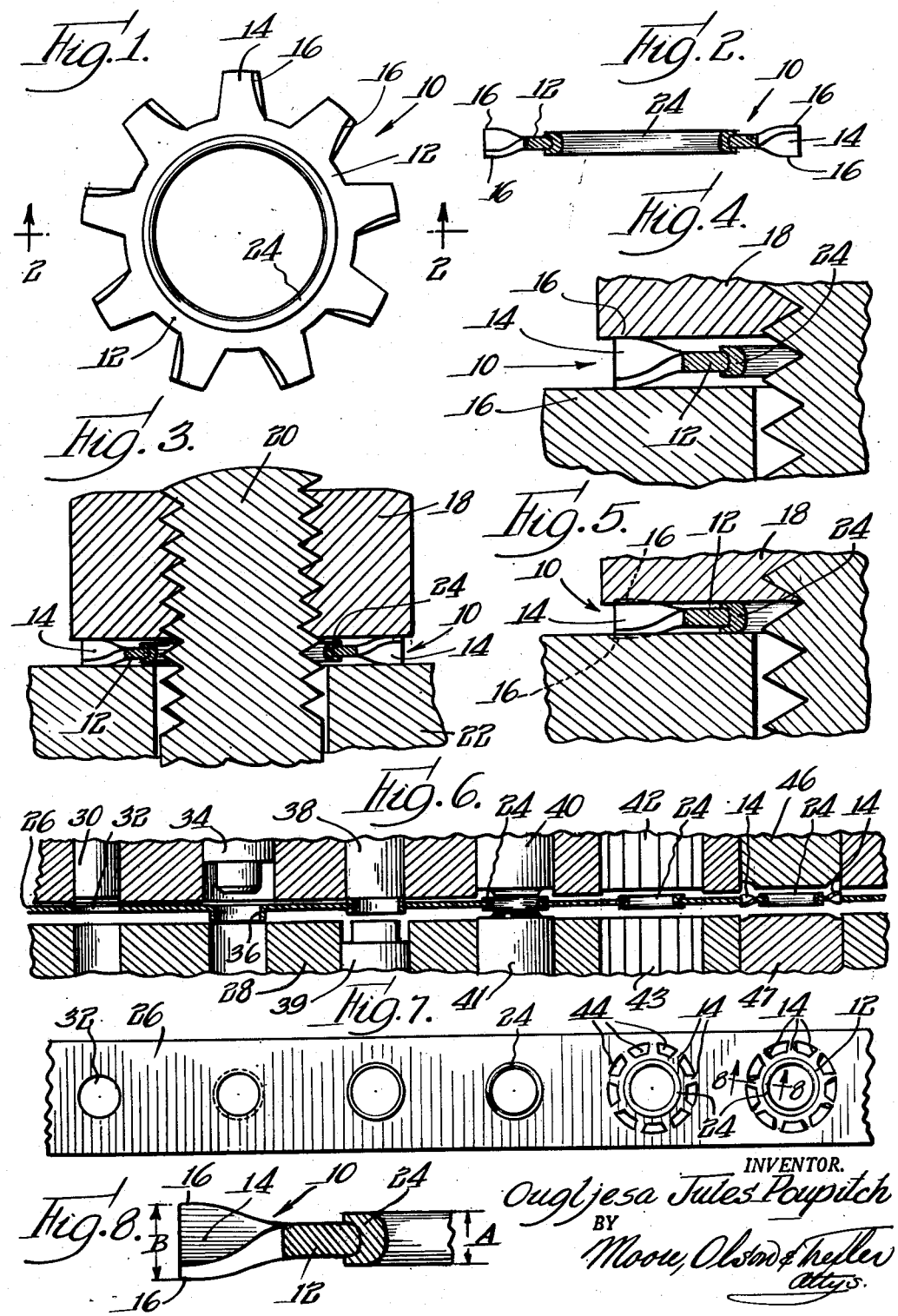
INVENTOR.
Ougljesa Jules Poupitch Jan. 19, 1954     O. J. POUPITCH     2,666,468
LOCK WASHER WITH THICK RIM AND METHOD OF MAKING SAME
Filed July 22, 1949     2 Sheets-Sheet 2
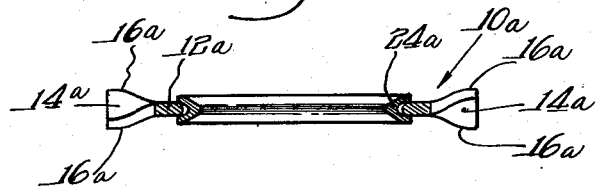
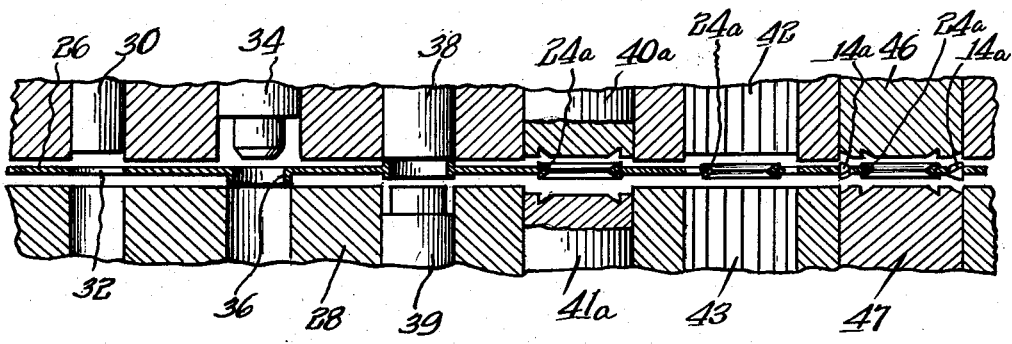
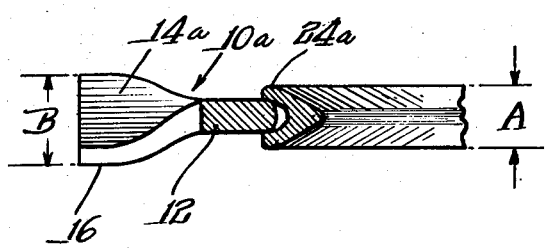
INVENTOR.
Ougljesa Jules Poupitch
BY
Moore, Olson & Trexler
Attys.

Patented Jan. 19, 1954

2,666,468

UNITED STATES PATENT OFFICE 2,666,468

LOCK WASHER WITH THICK RIM AND METHOD OF MAKING SAME

Ougljesa Jules Poupitch, Chicago, Ill., assignor to Illinois Tool Works, Chicago, Ill., a corporation of Illinois Application July 22, 1949, Serial No. 106,253

6 Claims. (Cl. 151—35)

This invention relates generally to lock washers and methods of producing them, and more particularly to lock washers in which a marginal portion thereof is thickened so as to provide a firm abutment for the clamping side of a rotary threaded fastener such as a screw head or nut.

When washers equipped with twisted or warped locking prongs are subjected to excessive clamping forces, there is a tendency for the prongs to flatten. In the use of lock washers equipped with marginal prongs twisted so as to position locking teeth on opposite sides of the plane of the washer body, maximum locking efficiency is obtained when these teeth occupy a strutting position as distinguished from a completely flattened position. Hence, it is advisable to provide means for limiting the extent to which the aforesaid lock washer prongs or teeth may be untwisted when the washer is tightened in position. The present invention is primarily concerned with the provision of a novel and extremely practical thickened rim construction for lock washers of the type referred to above which will prevent untwisting or flattening of washer teeth to the point where their locking efficiency is impaired, and the invention also contemplates unique methods of producing this thickened rim structure.

More specifically, the present invention contemplates a toothed lock washer in which the material of the washer is employed to overlie opposite sides of the body so as to provide a firm abutment.

It is a further object of the present invention to upset the margin of the washer body oppositely disposed from the locking teeth so as to present a grommet-like structure which in radial cross-section is U-shaped and overlies opposite sides of the body stock.

Still more specifically, the invention contemplates a novel method of producing lock washers of the type hereinbefore mentioned whereby one margin of the washer body is bent out of the plane of the body, axially shifted and subsequently forced into superimposed relation with respect to the opposed surfaces of the body stock so as to provide a thickened rim area.

The foregoing and other objects and advantages will be more apparent from the following detailed description, when considered in connection with the accompanying drawing, wherein—

Fig. 1 is a plan view of a lock washer which is representative of one embodiment of the present invention;

Fig. 2 is a central transverse sectional view of the lock washer taken substantially along the line 2—2 of Fig. 1;

Fig. 3 shows the lock washer, in section as in Fig. 2, positioned between the clamping side of a nut and a work surface;

Fig. 4 is an enlarged fragmentary sectional view of the left portion of the lock washer, as shown in Fig. 3, illustrating the positions occupied by the work surface and the clamping surface of the nut before final tightening against the washer teeth;

Fig. 5 is an enlarged fragmentary sectional view similar to Fig. 4 illustrating the position occupied by the parts after the nut has been completely tightened against the lock washer;

Fig. 6 is a vertical sectional view of a series of forming and stamping tools illustrating the various steps in the novel method of production contemplated by the present invention, starting with the initial hole punching operation at the left and continuing step by step until the completed thick rim lock washer is formed at the extreme right;

Fig. 7 is a plan view of the metal strip of Fig. 6 illustrating the various operations performed on the work piece or strip stock; and Fig. 8 is an enlarged fragmentary sectional view taken substantially along the line 8—8 of Fig. 7 illustrating in radial cross-section the structural features of the lock washer produced by the process illustrated in Figs. 6 and 7;

Figs. 9 to 11 inclusive disclose a modified form of thick rim lock washer and method of producing same; Fig. 9 being a central transverse sectional view similar to Fig. 2; Fig. 10 discloses a vertical sectional view of a series of forming and stamping tools for producing the washer of Fig. 9; and Fig. 11 is an enlarged fragmentary sectional view similar to Fig. 8, illustrating in radial cross-section the lock washer shown in Figs. 9 and 10.

Referring now to the drawings more in detail, wherein like numerals have been employed to designate similar parts throughout the various figures, it will be seen that one embodiment of a lock washer contemplated by the present invention is designated generally by the numeral 10. This lock washer 10 is of sheet metal stock and includes an annular body portion 12, the outer margin of which supports a plurality of washer prongs 14. Each of the prongs 14 extends radially outward from the outer margin of the body 12 and is warped or twisted so as to present work engaging locking teeth 16 normally projecting beyond the bounding planes of the washer body. Thus, when a threaded fastening member such as a nut 18, Fig. 3, is rotated on a complementary bolt or screw 20 so as to clamp the washer 10 between the clamping side of the nut and a complementary surface of a work piece 22, the teeth 16 on one side lockingly engage the clamping surface of the nut and the teeth 16 on the opposite side lockingly engage the work surface.

Particular attention is directed to the construction of the inner margin of the body 12 which is oppositely disposed from the margin which carries the prongs 14. This inner margin of the body 12 consists of a grommet-like element 24 which is formed integral with the flat annular washer body 12. The structural significance of the grommet-like portion 24 will be best understood from a description of the method employed to produce it. Attention is therefore directed to the method illustrated in Figs. 6 and 7. It will be seen from Fig. 6 that a strip of sheet stock 26 is positioned above a die block 28 supported upon the bed plate of a conventional punch press (not shown). The strip 26 is fed intermittently by any suitable and appropriate mechanism (not shown) along the upper surface of the aforesaid die block 28. As the strip is intermittently moved from left to right, Figs. 6 and 7, it passes beneath a series of vertically reciprocable stamping and forming tools about to be described. As the strip is introduced from the left side, it is brought to rest beneath a blanking punch 30 which, upon its downward stroke, produces an aperture 32. At the next station a forming die or tool 34 causes the inner margin of the stock surrounding the aperture 32 to be bent downwardly in the form of a flange 36. At the next station 38—39 the previously formed flange 36 is vertically shifted and swaged so as to produce flanges extending in opposite directions out of the plane of the washer stock. That is to say, in vertical cross-section the flange and stock present a T configuration, as distinguished from the L configuration presented by the first formed flange 36. At the station 40—41 the previously formed flanges are forced or bent into overlying relation with respect to the sheet metal stock. Thus, a grommet-like element is formed from the material of the washer stock. At the next station 42—43 apertures 44, Fig. 7, are produced, the material between these apertures providing the stock from which the washer prongs are ultimately formed. In the next station 46—47 the partially formed prongs are twisted. The lock washer is now ready to be completely severed from the stock 26.

Particular attention is directed to certain effects upon the strip stock when the initially extruded flange is forced back so as to provide an annular flange on the opposite side of the stock. During this step of the method, there is a tendency for the stock to fracture at the point where the flange joins the flat stock. That is to say, as the initially formed or extruded flange is forced axially it becomes sheared from the body of the stock. Simultaneously with this shearing effect, the oppositely disposed flange portions have a tendency to be deflected laterally outward. Thus, as the strip stock shifts from the third to the fourth step in the die, the sheared collar will not fall away from the stock. The aforesaid slight lateral swaging of the opposite margins of the collar is sufficient to counteract any tendency to force the collar through the stock.

If, during the step in the method just described, the collar does not become completely sheared from the stock, the next or fourth step in the method results in complete severance or shear. Thus, as the opposite margins of the previously formed collar are bent into overlying relation with respect to the sheet material, a grommet is produced which is completely severed from the work piece from which it was formed.

The aforesaid grommet-like member 24 cooperates with the flat annular body portion 12 in providing a thickened area to limit the extent to which the clamping surface of the nut and the complementary work surface may approach each other. It will be seen that the thickness of the grommet-like element 24, as indicated by the letter A, Fig. 8, is sufficiently less than the overall axial extent of the prongs 14 indicated by the letter B in Fig. 8 to permit the teeth 16 to embed themselves within the clamping surfaces before these surfaces move into clamping engagement with the opposite sides of the element 24. Thus, when the element 24 is firmly clamped between the complementary surfaces of the work and nut, the teeth 16 will occupy a position of maximum locking effectiveness. At this position of maximum locking effectiveness, the prongs 14 provide an angular locking stud between the clamping surfaces. If the material of the work or nut is relatively soft, the washer teeth will have a tendency to embed themselves before exerting the final strut action.

In Figs. 9 to 11 inclusive a slightly modified form of thick rim washer structure is disclosed. This washer is designated generally by the numeral 10 and differs only from the lock washer 10a in the provision of a thick rim 24a of arrow head cross-section. In certain applications it may be desirable to have an inner rim structure which is not only of thickened form but is also relatively thin along its margin. The method employed in the production of the thick rim washer 10a is similar to the method previously described, the only difference being in the station 40a—41a where tools are employed which are designed especially to produce the arrow head form of rim. Fig. 11 is similar to previously described Fig. 8, and similar numerals bearing the suffix (a) are employed to designate corresponding washer parts.

It will be apparent from the foregoing description that the present invention contemplates a lock washer of improved practical construction as well as novel and practical methods of producing such lock washers. The method disclosed herein enables a thickened rim to be produced from the washer stock in the form of an integral grommet. Furthermore, this material, as shown in the drawing, would otherwise constitute scrap. That is to say, a portion of the material normally punched from the stock to provide the lock washer aperture is used to provide the annular sections positioned on opposite sides of the washer body. Hence, the method of the present invention enables the production of a thickened rim area of the type herein shown without requiring additional stock. By employing the method contemplated by the present invention, manufacturing costs may be kept to a minimum. In instances where the lock washer is to be preassembled with a rotary threaded fastener such as a nut, the grommet portion may be held tightly against rotation without effecting the desired relative rotation between the lock washer and nut. This free mounting of the washer within the grommet results from complete fracture or severance at the juncture of the washer stock with the grommet portion. Obviously, in performing the step of bending the grommet stock, this stock must not be clamped against the opposite surface of the washer if free rotation of the washer within the grommet is to be obtained. This may be controlled in the proper design of the die mechanism. In order to prevent the grommet from being clamped against the washer body when tightened against a work piece, the washer structure must be subjected to proper hardening.

While for purposes of illustration certain specific structural features of a lock washer, as well as certain specific punch and die tools, have been described herein, it will be understood that the present invention contemplates various modifications and changes without departing from the spirit and scope of the appended claims.

The invention is hereby claimed as follows:

1. The method of producing washers with a thickened rim which includes the steps of extruding one margin of the washer stock in a given direction out of the plane of said stock to form a flange, applying pressure to said extruded flange portion transversely of the washer stock so as to force said flange portion bodily in the opposite direction out of the plane of said stock with respect to the immediately surrounding portion of the stock to provide flange portions on opposite sides of the plane of the stock, and then folding each of said flange portions into overlying relation with respect to opposite sides and edge of the adjacent margin of the washer stock so as to provide a thickened rim section.

2. The method of producing washers as set forth in claim 1, which includes the step of forming locking teeth in the portion of the washer stock positioned radially outwardly from the thickened rim section.

3. The method of producing washers as set forth in claim 1, which includes the step of shearing the stock in the vicinity of the flange when said flange is bodily shifted.

4. The method of producing washers as set forth in claim 1, which includes the step of successively moving a strip of washer stock past a plurality of stations to produce the metal working operations set forth herein.

5. The method of producing washers as set forth in claim 1, which includes the step of shaping the bodily shifted rim portion into an annular section of substantially arrowhead cross-section.

6. A lock washer comprising a single sheet metal centrally apertured blank including an annular body portion surrounding said aperture and positioned in a plane normal to the washer axis, a plurality of resilient prongs positioned along the outer margin of said body and flexed to present teeth projecting predetermined distances from opposite sides of the bounding planes of said washer body, and a grommet-like member carried by the inner margin of said washer body having a substantially cylindrical section intermediate opposed flanges of substantially equal widths, said flanges being less in axial dimension than the thickness of said annular body portion and also thinner than the radial thickness of the cylindrical section of said grommet-like member, said flanges adjacently embracing opposite sides of the annular body and extending in parallelism with said body, said flanges presenting rigid opposed abutment surfaces located in planes spaced axially from the aforesaid bounding planes a predetermined distance which is less than the height of said locking teeth so as to assure initial engagement of said teeth when clamped between a pair of work surfaces, the size and cross-sectional shape of said grommet-like member being such as to enable it to be formed from a marginal portion of the sheet metal stock defining the blank aperture which would otherwise represent scrap.

OUGLJESA JULES POUPITCH.

References Cited in the file of this patent

UNITED STATES PATENTS

| Number | Name | Date |
|---|---|---|
| 843,704 | Schindler | Feb. 12, 1907 |
| 1,502,873 | Oberg | July 29, 1924 |
| 1,740,852 | Frischmuth | Dec. 24, 1929 |
| 1,807,258 | Schwartz | May 26, 1931 |
| 1,906,953 | Enghauser | May 2, 1933 |
| 1,963,027 | Olson | June 12, 1934 |
| 2,321,155 | Poupitch | June 8, 1943 |
| 2,322,776 | Poupitch | June 29, 1943 |

FOREIGN PATENTS

| Number | Country | Date |
|---|---|---|
| 779,361 | France | Apr. 3, 1935 |